United States Patent [19]
Ford et al.

[11] Patent Number: 5,506,937
[45] Date of Patent: Apr. 9, 1996

[54] CONCEPT MAPBASED MULTIMEDIA COMPUTER SYSTEM FOR FACILITATING USER UNDERSTANDING OF A DOMAIN OF KNOWLEDGE

[75] Inventors: Kenneth M. Ford, Golf Breeze; Alberto J. Cañas; John W. Coffey, both of Pensacola, all of Fla.

[73] Assignee: University of West Florida, Pensacola, Fla.

[21] Appl. No.: 42,242

[22] Filed: Apr. 2, 1993

[51] Int. Cl.⁶ .................................................. G06F 15/00
[52] U.S. Cl. ........................... 395/12; 395/11; 395/63; 395/76; 364/413.02; 364/419.08
[58] Field of Search ............................ 395/12, 11, 63; 364/400, 413.02, 413.13, 419.08

[56] References Cited

U.S. PATENT DOCUMENTS

| | | | |
|---|---|---|---|
| 4,733,354 | 3/1988 | Potter et al. | 364/413.02 |
| 4,752,889 | 6/1988 | Rappaport et al. | 395/12 |
| 4,813,013 | 3/1989 | Dunn | 395/159 |
| 4,839,822 | 6/1989 | Dormond et al. | 395/52 |
| 4,866,634 | 9/1989 | Reboh et al. | 395/12 |
| 4,866,635 | 9/1989 | Kahn et al. | 395/12 |
| 4,905,163 | 2/1990 | Garber et al. | 395/63 |
| 4,924,408 | 5/1990 | Highland | 395/50 |
| 4,931,950 | 6/1990 | Isle et al. | 395/11 |
| 4,945,476 | 7/1990 | Bodick et al. | 364/413.02 |
| 4,965,741 | 10/1990 | Winchell et al. | 395/12 |
| 5,021,976 | 6/1991 | Wexelblat et al. | 395/159 |
| 5,157,768 | 10/1992 | Hoeber et al. | 395/157 |
| 5,175,812 | 12/1992 | Krieger | 395/156 |

OTHER PUBLICATIONS

Knowledge–based visualization of Myocardial Perfusion E. V. Garcia et al. IEEE 22–25 May 1990.
Ford et al., *ICONKAT: an integrated constructivist knowledge acquisition tool*, Knowledge Acquisition 3, (1991), pp. 15–25.

Novak, J. D. and Gowin, D. B., *Learning how to learn*, Cambridge University Press (1984), pp. 15–25.

Ford et al., *Interpreting Functional Images with NUCES: Nuclear Cardiology Expert System*, presented at the Florida AI Research Symposium (Flairs–92), Ft. Lauderdale, FL., Apr. 1992.

Primary Examiner—Allen R. MacDonald
Assistant Examiner—Richemond Dorvil
Attorney, Agent, or Firm—Calfee, Halter & Griswold

[57] ABSTRACT

A computer system having an explanation facility for facilitating user understanding of concepts underlying a domain of knowledge which enables a user to interact with and explore the domain of knowledge. The explanation facility utilizes a concept-map based representation of a domain of knowledge and several icons to control the mode of output of information from the computer system. Each concept map has concept nodes which represent concepts in the domain of knowledge, links between the concept nodes, and icons. The icons are positioned at the concept nodes and represent alternative modes of output of information from the computer system. A user desiring more information about a concept node can select one of the icons corresponding to the mode of output of information desired. Modes of output of information include audio, video (images and movies), text, concept maps, and combinations of the foregoing. Through the use of concept maps and icons that control modes of output of information, a user may navigate the domain of knowledge and retrieve information specific to the user's particular needs.

9 Claims, 14 Drawing Sheets

CONCEPT MAPBASED MULTIMEDIA COMPUTER SYSTEM FOR FACILITATING USER UNDERSTANDING OF A DOMAIN OF KNOWLEDGE

TECHNICAL FIELD

The present invention relates to a system which facilitates user understanding of a domain of knowledge, such as a domain of knowledge underlying a knowledge-based system. The present invention is particularly useful in facilitating user understanding of a domain of knowledge underlying an expert system such as a nuclear cardiology expert system designed to aid physicians in offering a diagnosis on the basis of first pass cardiac functional images.

BACKGROUND OF THE INVENTION

Applicants believe there is an important need for providing new and useful tools for facilitating user understanding of a domain of knowledge. Facilitating user understanding of a domain of knowledge can be useful for various purposes, e.g., as a teaching tool or reference tool about the domain of knowledge, or as a tool for facilitating user understanding of a domain of knowledge underlying a knowledge-based system (e.g., an expert system). For example, in the applicants' experience, when a user requests an expert system to explain its conclusions or its reasoning, the system typically provides the specific logic behind its conclusion or its reasoning (e.g., the system would respond by explaining ". . . data parts A, B & C, lead to inference D; data part E, coupled with inference D, lead to conclusion F . . ."). Alternatively, with some types of expert systems, when a user makes a request for an explanation of a system's conclusion or its reasoning, the system provides a fixed or "canned" response to the explanation request.

In applicants' view, such approaches to explanation, while useful to some degree, leave significant areas for improvement. For example, an expert system should have an explanation facility which provides the user with a fuller understanding of the expert's domain of knowledge underlying the expert system. Moreover, the explanation facility should provide the user with the ability to interact with and explore (navigate) a particular domain of knowledge, thereby enabling the system to be used as a teaching or reference tool.

SUMMARY OF THE PRESENT INVENTION

The present invention provides a new and useful system for facilitating user understanding of a domain of knowledge. The present invention is particularly useful for facilitating user understanding of a domain of knowledge underlying a knowledge-based system, such as a nuclear cardiology expert system which is designed to aid physicians in arriving at a diagnosis on the basis of first pass functional imaging of the heart. Moreover, the present invention is designed to be user friendly, and to facilitate user understanding of a domain of knowledge in a manner which enables the invention to be used as a teaching or reference tool with respect to the domain of knowledge.

According to the present invention, a domain model is provided which represents knowledge about a particular topic. The domain model includes (i) at least one concept map which represents a hierarchical framework of concepts illustrating the relationship(s) between selected concepts, and (ii) supporting devices including mediating representations associated with selected concepts in the concept map. A user interface is provided which (i) displays the domain model, or selected portions thereof, and (ii) enables a user to enter the domain model and to interact with the supporting devices to understand and explore the domain model.

A user can enter the domain model either at the most general of the concepts provided in the domain model, or at the location in the domain model most apropos to that part of the domain of knowledge which is of interest to the user when the user enters the domain model. For example, when the present invention is being used as an explanation facility for an expert system, if the user makes an explanation request at a certain point in the user's consultation with the expert system, the user is conveyed to that location in the domain model which is most apropos to the explanation request. On the other hand, if the invention is being used as a reference or teaching tool with respect to a topic, the user can be conveyed to a location in the domain model which is related to a particular part of the topic selected by the user. Or, if the user chooses not to select a particular part of the topic, the invention can default to a condition in which it conveys the user into the domain model at the most general of the concepts found in the domain model.

Once the user has entered the domain model, the user interface and the supporting devices, particularly the mediating representations, enable the user to interact with and explore the domain model. According to the preferred embodiment, the mediating representations include (i) audio devices, (ii) visual devices, (iii) video devices (e.g., motion pictures), (iv) textual devices, (v) different concept maps, (vi) repertory grids (which are particularly useful as knowledge acquisition/explanation tools in expert systems), and (vii) combinations of the foregoing. Moreover, certain mediating representations can be selectively associated with other mediating representations to enhance the flexibility of the tools available to a user to enable the user to understand and explore the domain model.

A system according to the present invention is particularly useful in connection with an expert system, for example, such as a nuclear cardiology expert system. In the nuclear cardiology expert system, first pass functional imaging of a patient's heart, along with certain numeric patient data, are analyzed via a knowledge-based system which can draw on several sources (e.g., image database, case library, diseases knowledge base, objects and classes knowledge base, etc.) to construct a diagnosis for the patient. The present invention can function as an explanation tool, reference tool, or teaching tool for such an expert system. The domain model is constructed to reflect the domain of knowledge (i.e., the human cognitive processes) of the expert(s) upon whose knowledge the expert system is based. The domain model includes (i) at least one concept map relating to the expert(s)' view of first pass cardiac functional imagery, and (ii) supporting devices including mediating representations (e.g., audio devices, visual devices, video devices, other concept maps, repertory grids, textual devices) connected with selected concepts forming nodes of the concept map. Each of the mediating representations has an icon associated therewith. A user interface is adapted to (i) display the domain model, or selected portions thereof (including the concept maps and other mediating representations and the icons associated therewith), and (ii) respond to inputs from the user to enable the user to interact with the supporting devices to understand and explore the domain model. Thus, as the expert system is being used for performing a diagnosis, the user can enter the domain model to understand the expert(s)' reasoning in forming the diagnosis. On the other hand, the user can enter and explore the domain model apart from the expert system, using the domain model as a teaching or reference tool.

Further objects and advantages of the present invention will become increasingly apparent from the following detailed description and the accompanying drawings.

BRIEF DESCRIPTION OF THE DRAWINGS

FIGS. 5–14 are schematic illustrations of portions of an explanation facility constructed according to the principles of the present invention.

DETAILED DESCRIPTION OF THE PREFERRED EMBODIMENT

As described above, the preferred embodiment of the present invention is designed to facilitate user understanding of a domain of knowledge underlying a knowledged-based system, such as a nuclear cardiology expert system. The following detailed description illustrates the manner in which the present invention can be used with a nuclear cardiology expert system, NUCES, designed to aid physicians in offering a diagnosis on the basis of first pass cardiac functional images. However, it will also become clear that the present invention has uses well beyond a NUCES type system. For example, it will be clear that the principles of the present invention can be used to construct explanation facilities for other expert systems, or to construct teaching or reference tools for exploring domains of knowledge.

Figure 1:
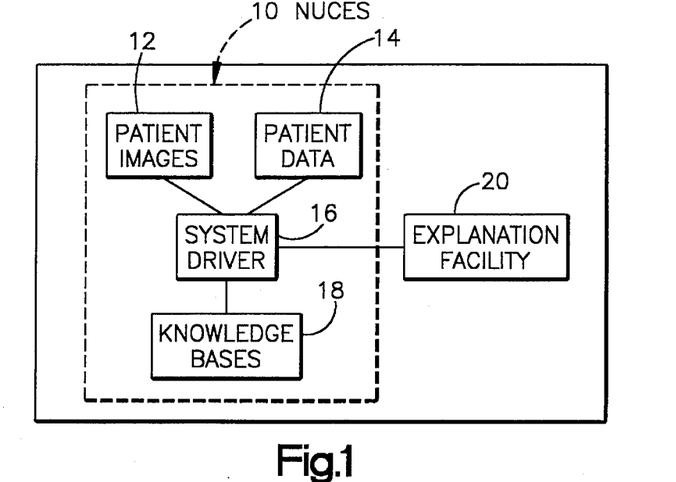
FIG. 1 schematically illustrates a nuclear cardiology expert system with an explanation facility constructed according to the principles of the present invention for enabling the user to enter and interact with the domain of knowledge of an expert in nuclear cardiology.

FIG. 1 schematically illustrates how a system constructed according to the present invention can be used in connection with a nuclear cardiology expert system 10 (NUCES). In such an expert systems first pass functional imaging of a patient's heart, along with certain numeric patient data, provide a patient image base 12 and a patient data base 14, which are analyzed via a knowledge-based system driver 16 which can draw on several knowledge bases 18 (e.g., image database, case library, diseases knowledge base, objects and classes knowledge base, etc.) to perform a diagnosis for the patient. The present invention embodies a computer-based method of organizing and representing domain knowledge that provides a browseable facility which can function as an explanation tool for expert systems, a reference tool or a teaching tool.

Figure 2:
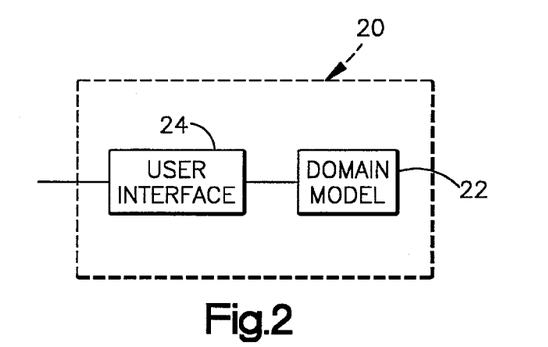
FIG. 2 schematically illustrates the principal components of a system constructed according to the principles of the present invention for facilitating user understanding of a domain of knowledge.

Referring to FIG. 2, the explanation facility 20 includes a data processing system including an input device, a data structure defining a domain model 22, and a user interface 24. The domain model 22 is constructed to reflect the knowledge (i.e., the human cognitive processes) of an expert in nuclear cardiology. The domain model 22 includes (i) at least one concept map relating to the expert's view of first pass cardiac functional imagery, and (ii) supporting devices including mediating representations (e.g., audio devices, visual devices, video devices, other concept maps, repertory grids, textual devices) connected with selected concepts forming nodes of the concept map. Each of the mediating representations has an icon associated therewith which symbolizes the availability of that particular mediating representation at each node in a concept map.

The user interface 24 is adapted to (i) display the domain model, or selected portions thereof (including the concept maps and other mediating representations and the icons associated therewith), and (ii) respond to inputs from the user to enable the user to enter the domain model and to interact with the supporting devices to understand and explore the domain model. Thus, as the expert system is being used for performing a diagnosis, the user interface 24 enables the user to enter and explore the domain model 22 to understand the expert(s)' reasoning in forming the diagnosis. On the other hand, the user interface 24 also enables the user to enter and explore the domain model 22 apart from the expert system, and to use the domain model 22 as a teaching or reference tool in connection with nuclear cardiology.

A system according to the present invention can be implemented on a Macintosh™ Quadra computer. The Macintosh™ Quadra computer has extensive visual and sound capabilities that enable a user interface and domain model to be constructed as described herein, in accordance with the principles of the present invention. Programming of the Macintosh™ Quadra computer can be done in various programming languages, to implement the principles of the present invention. For example, the programming for creating the domain model and user interface described below were written in the "C" programming language.

Figure 5:
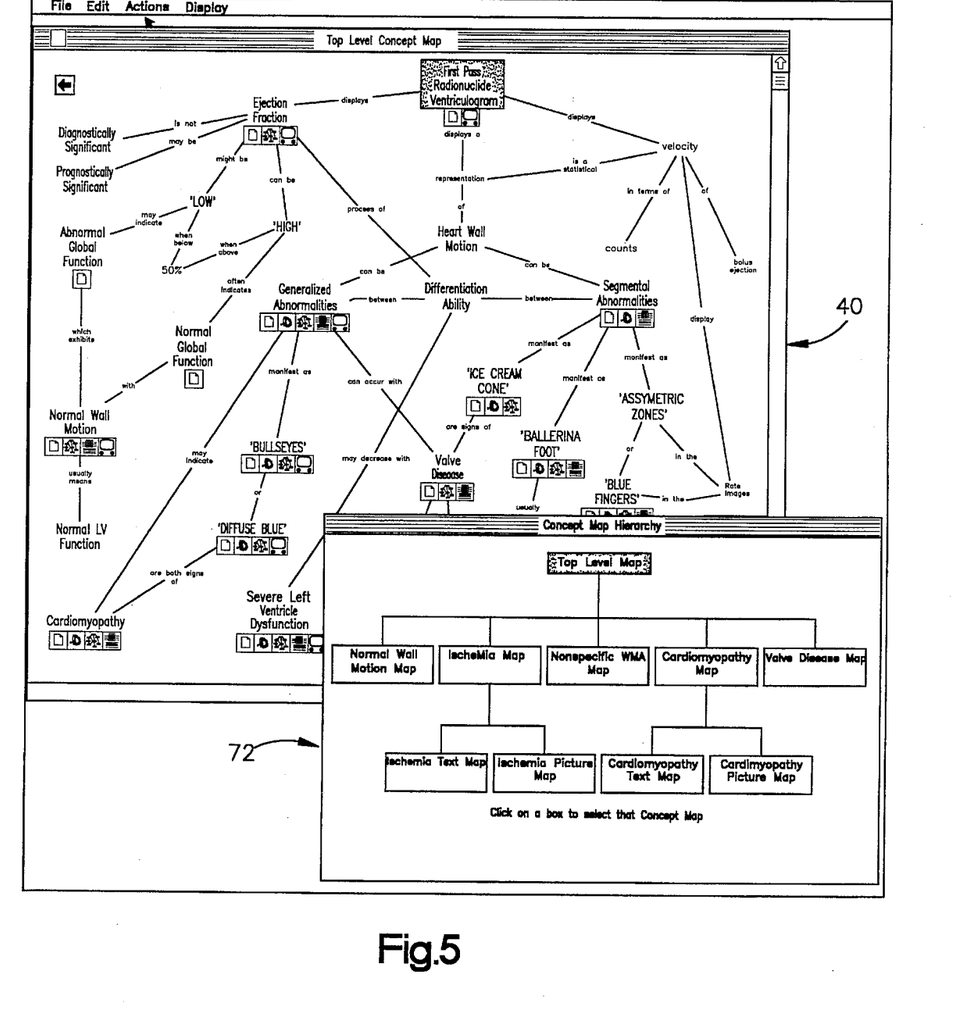
Figure 6:
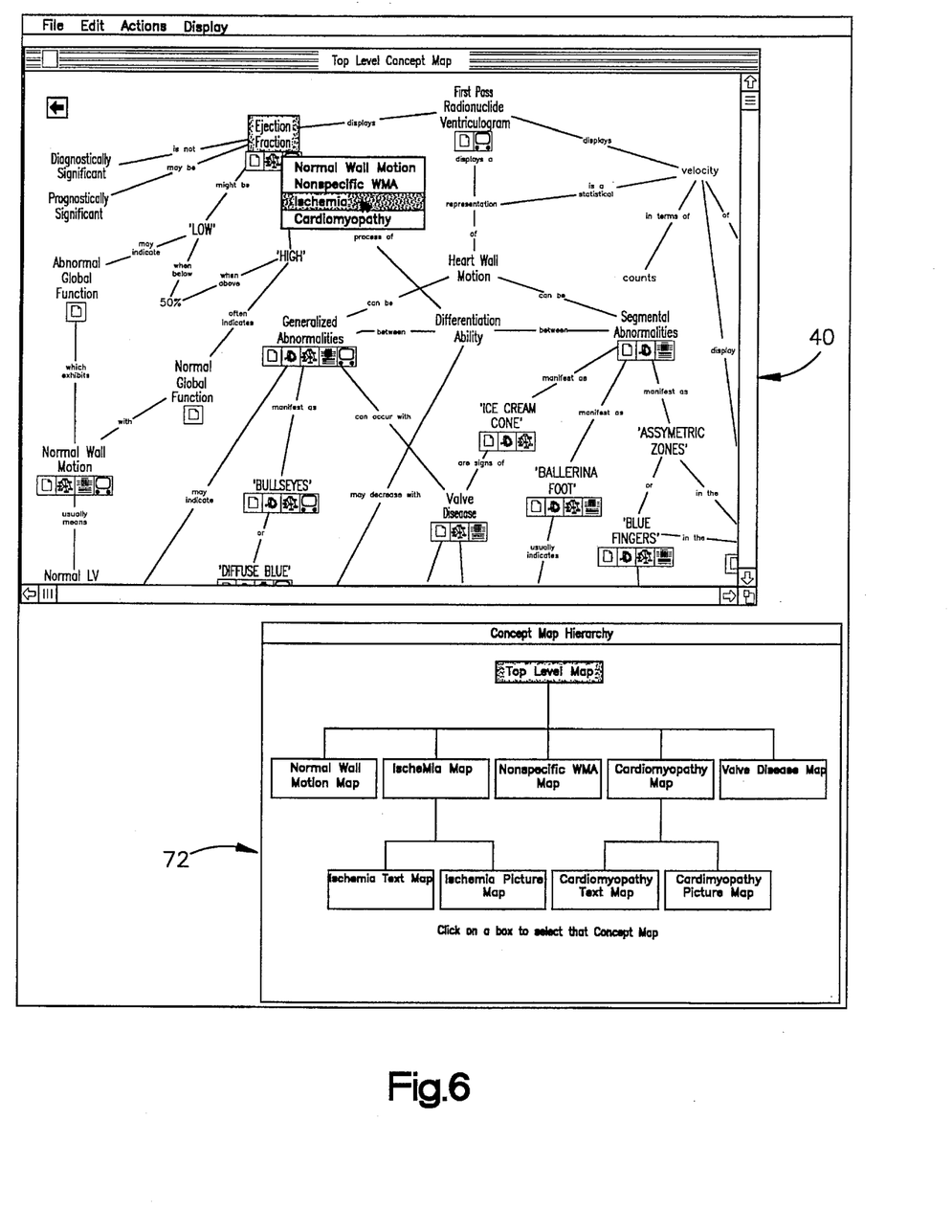
Figure 7:
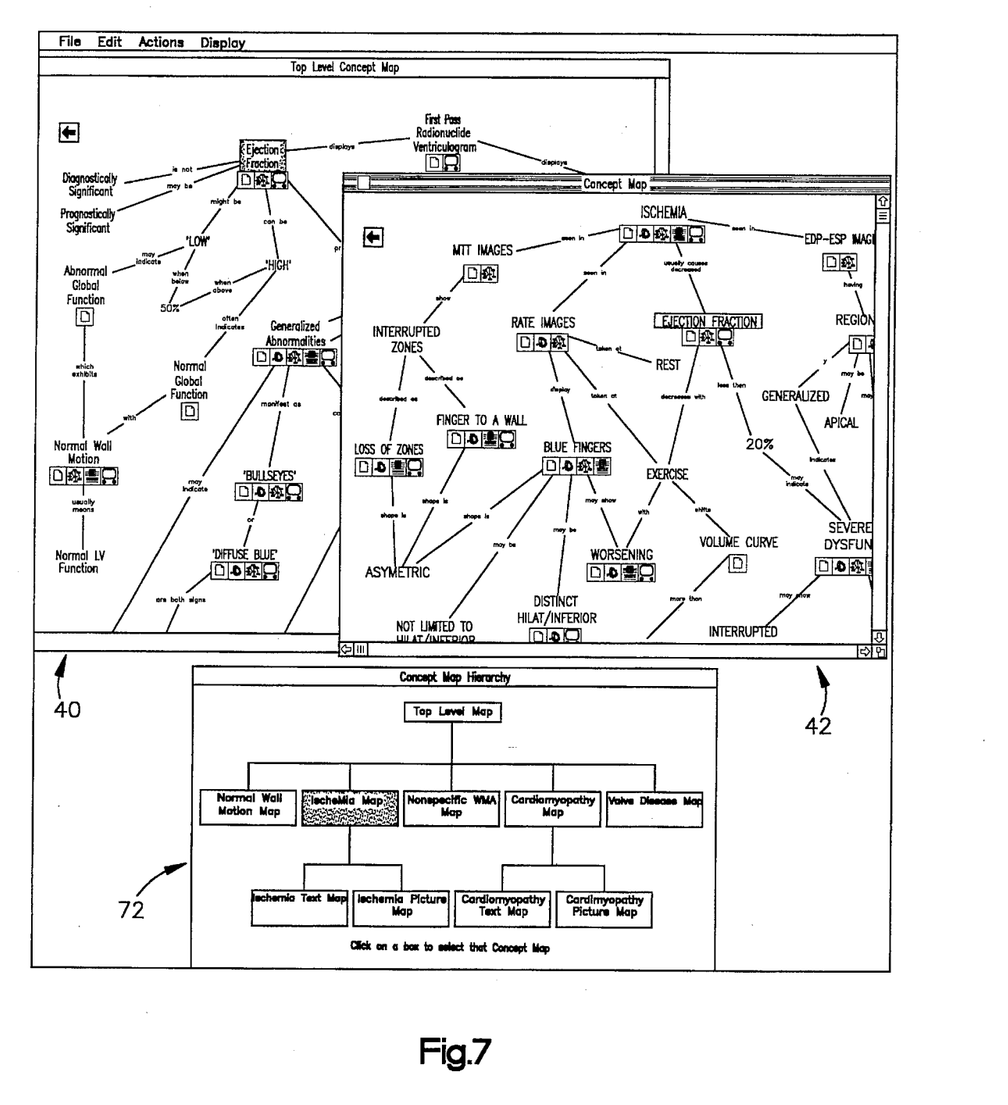

The components of the domain model and the user interface, which form the essence of the present invention are illustrated in FIGS. 5–14. The domain model is based upon an expert view of a topic (e.g., nuclear cardiology) and includes at least one concept map (see the top level concept map in window 40 in FIGS. 5 and 6), and preferably several concept maps (an Ischemia concept map is shown in window 42 in FIG. 7). Each concept map is formed by a series of nodes (see Ischemia node 44 in the Ischemia concept map shown in window 42 in FIG. 7), and links between selected nodes (see e.g., links 46, 48 in the concept map shown in window 42 of FIG. 7). The nodes represent different concepts of the expert's view of the topic. The links represent relationships between selected concepts, also according to the expert's view of the topic. Together, the nodes and links organize the concepts into a hierarchical framework representing at least a portion of the expert's view of the topic. Thus, in FIG. 5, the top level concept map shown in window 40 represents an overview of the expert's view of the domain wherein the node labeled "first pass radionuclide ventriculogram" represents the nuclear cardiology expert's broadest concept relating to that topic. In FIG. 7, the Ischemia concept map shown in window 42 presents an overview of the expert's view of Ischemia.

Supporting devices are associated with selected nodes of each concept map. The supporting devices are preferably one or more mediating representations of a type taken from a group comprising (i) audio devices, (ii) visual devices, (iii) video devices (e.g., motion pictures), (iv) textual devices, (v) repertory grids, and (vi) other concept maps. The mediating representations provide tools which expand the expert's explanation of concepts forming part of the domain model and/or which direct the user to other related concepts (or to other related mediating representations), to enable the user to interact with the domain model, to understand and explore the domain model.

Figure 15:
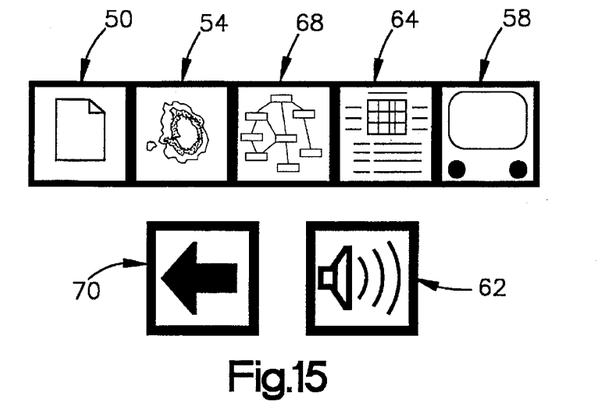
FIG. 15 is an enlarged, schematic illustration of some of the icons associated with the mediating representations of a system according to the invention.

An icon is associated with each mediating representation. FIG. 15 illustrates the icons 50, 54, 58, 62, 64, 68 which are associated with the preferred mediating representations for the nuclear cardiology domain model. FIG. 15 also illustrates an icon 70 which represents another supporting device which is not a mediating representation, but instead enables backtracking through the domain model.

The icon 50 symbolizes textual devices ranging from brief text-based descriptions of the relevant concepts (as shown in window 52 of FIG. 9) to indepth journal articles or segments from books. When a plethora of textual documents are available for a particular concept, they are organized in a concept map as shown in window 51 of FIG. 8.

Figure 10A:
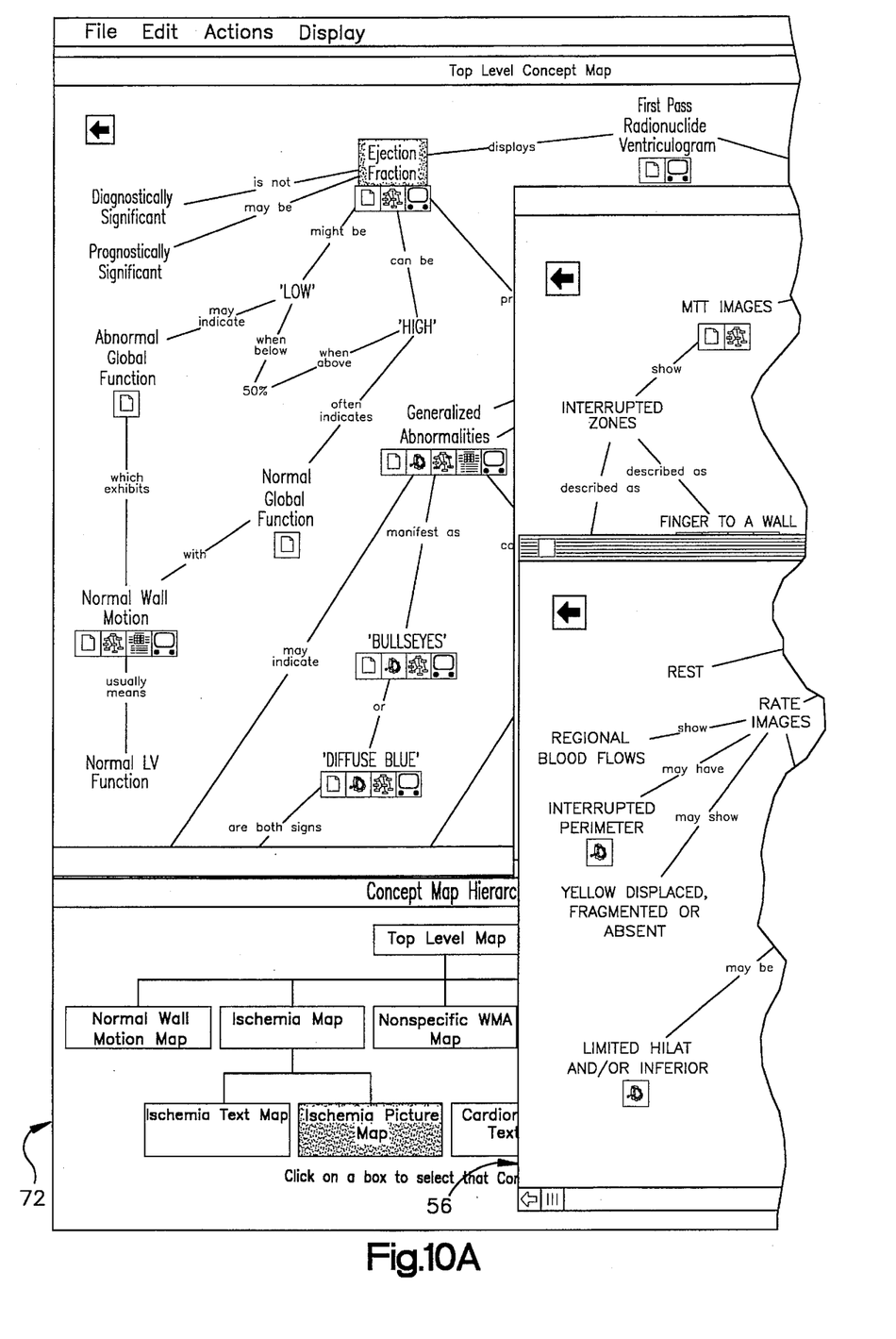
Figure 10B:
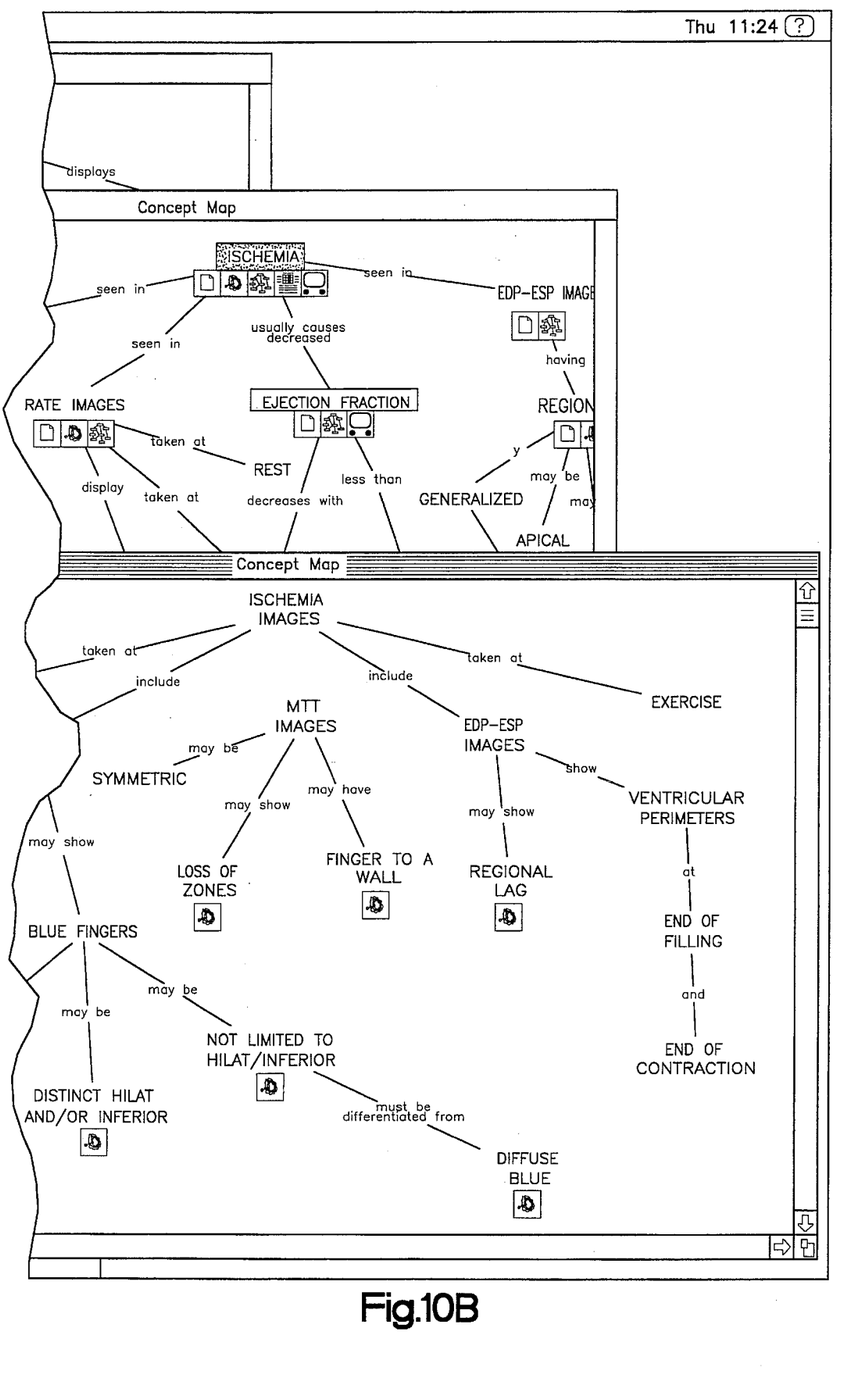
Figure 11:
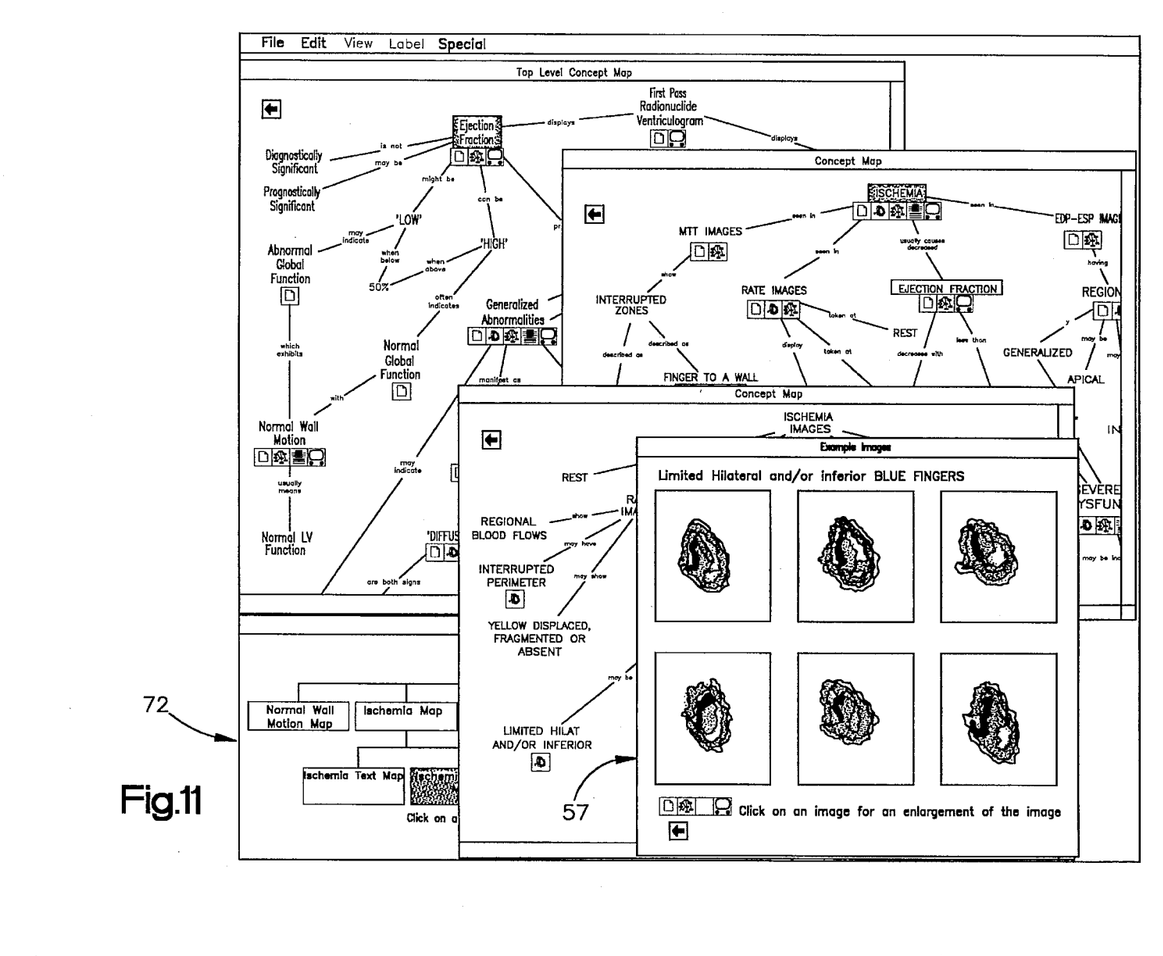

The icon 54 symbolizes images of various kinds, including drawings and photographs (among others) as shown in window 57 of FIG. 11. As with the other mediating representations, when a plethora of relevant visual images are available for a particular concept, they are organized in a concept map as illustrated in window 56 of FIGS. 10A and 10B. In the example of FIGS. 5–14, the images may comprise nuclear cardiology patient images which are digitized, grouped in accordance with the expert's domain of knowledge, and disposed within respective windows in the domain model.

Figure 13:
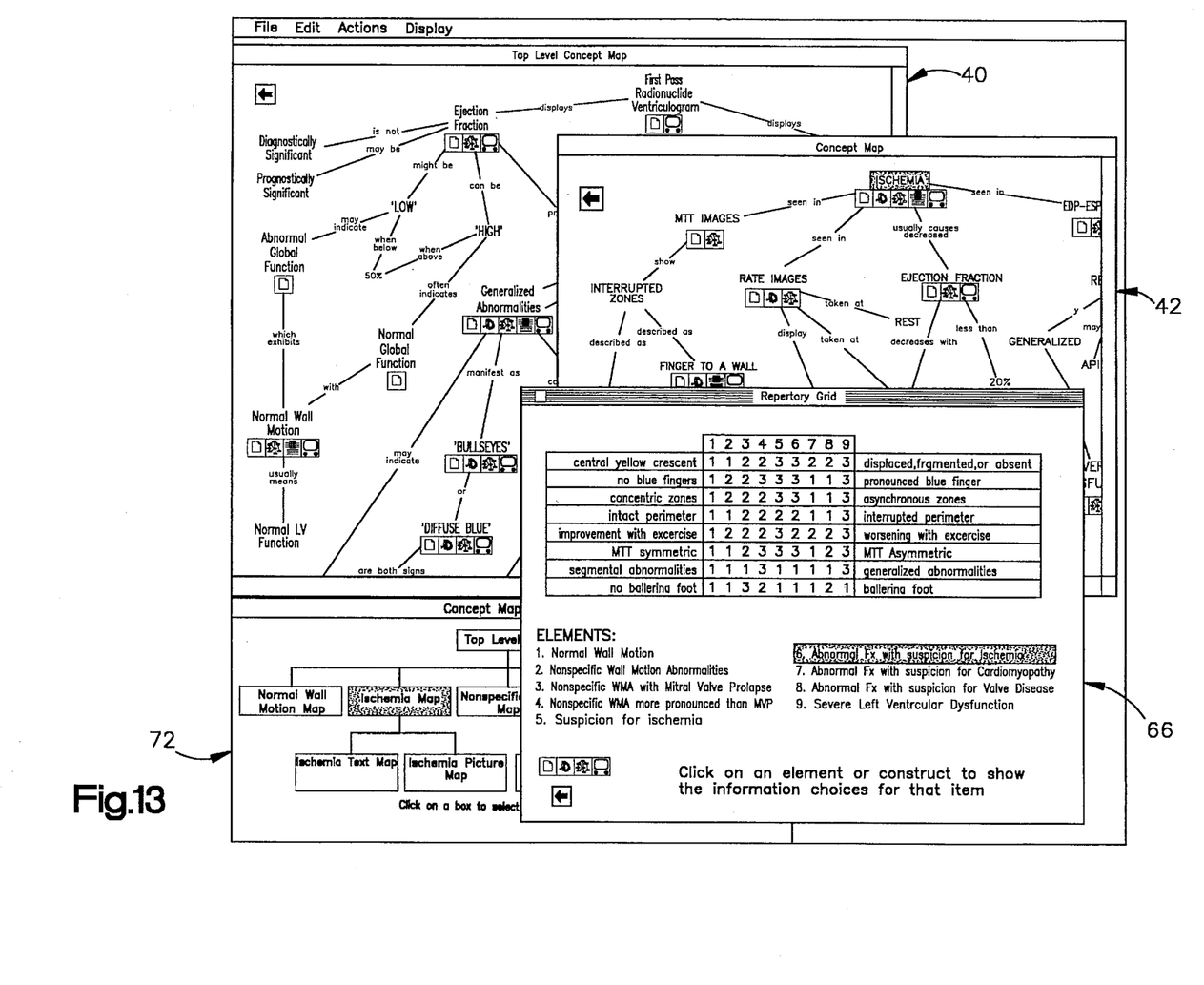
Figure 14:
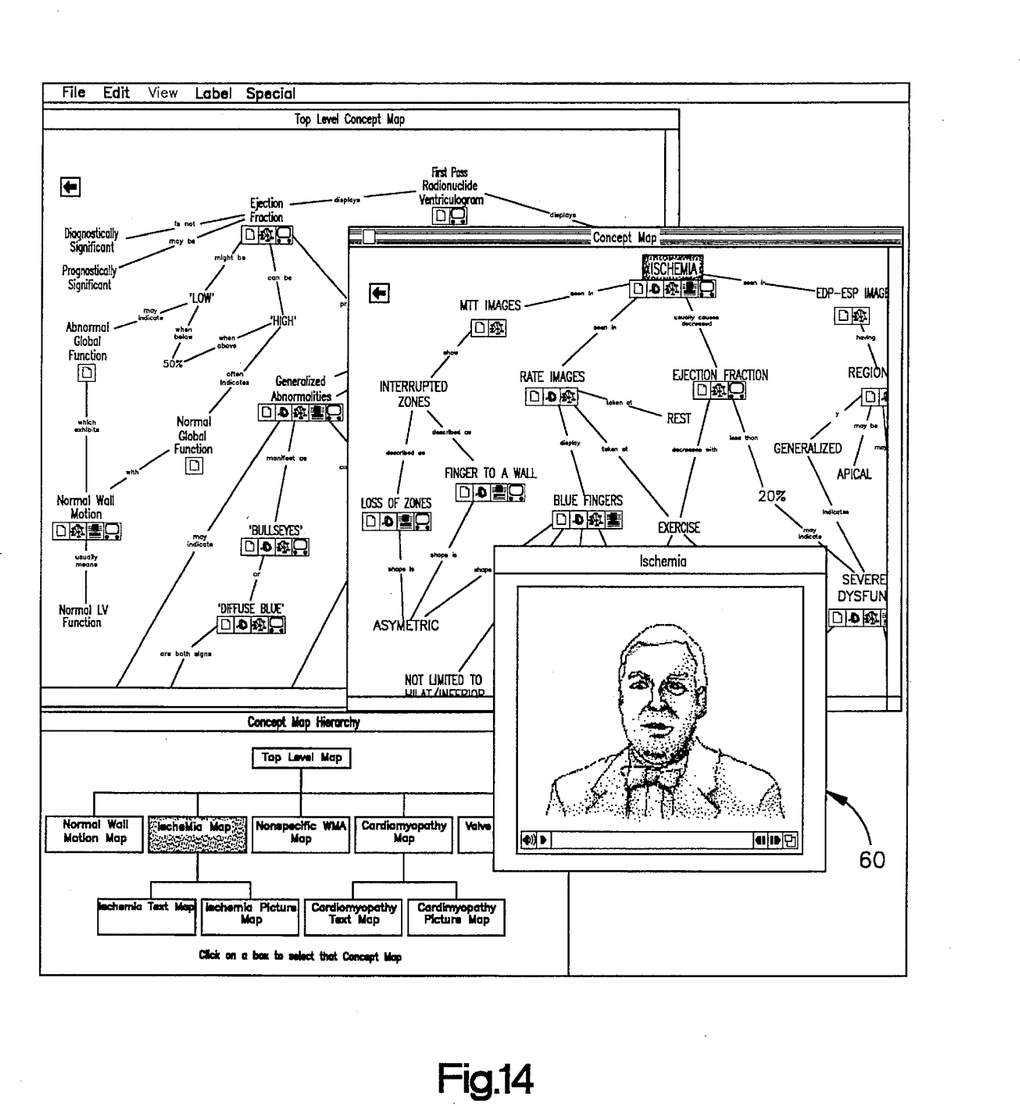

The icon 58 symbolizes a video device (e.g., as shown in the window 60 in FIG. 14). The video device appears as a window 60 with a view of the expert describing aspects of the domain model. The audio/visual device preferably comprises a digitized segment of a video recording. The video device can be produced using Quicktime (an extension of the Macintosh™ operating system), and various audio/visual tools available in a Macintosh™ environment. In the example of FIGS. 5–14, the video devices were produced using Quicktime, a program called "Media Grabber", marketed by Raster Ops Corporation, Santa Clara, Calif., a Raster Ops 24XLTV graphics board and a Raster Ops Movie Pak daughter board.

The icon 62 symbolizes audio devices (e.g., sound recordings of an expert's explanation of a part of the domain model). The sound recordings can be readily integrated into the domain model, using tools readily available in a Macintosh™ environment.

The icon 64 symbolizes a repertory grid (e.g., as shown in window 66 in FIG. 13). A repertory grid is a knowledge acquisition/explanation tool comprising a grid constructed of elements identified by the expert as related to different concepts of the domain model and values which are incorporated into the grid to weight the expert's view of those elements toward one or the other of the concepts, to help explain and/or illustrate certain aspects of an expert's view of those elements and concepts.

Figure 12:
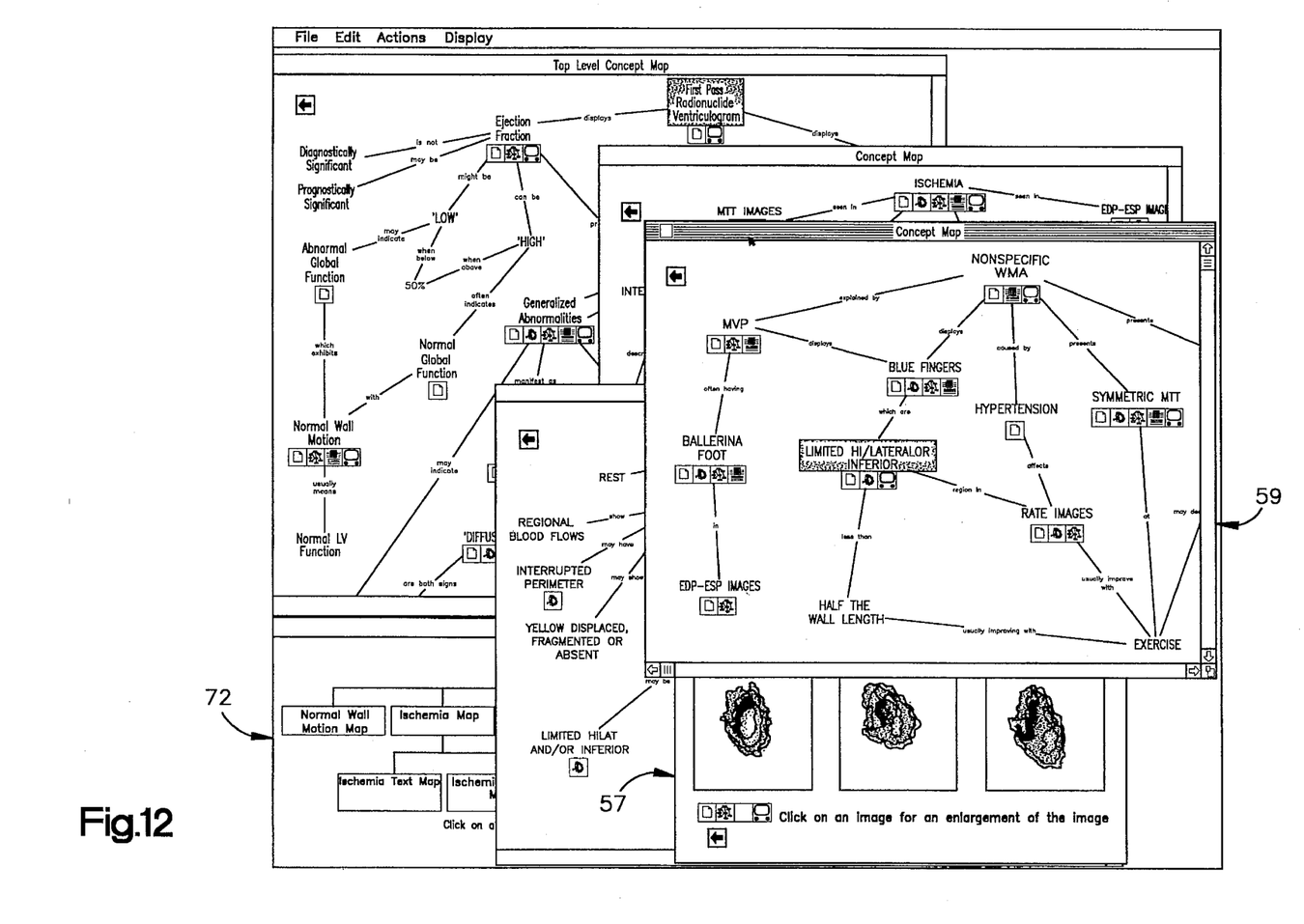

The icon 68 symbolizes other concept maps (e.g., as shown in windows 40, 42 and 59 in FIGS. 5, 7, and 12). When the user selects this icon, a popup menu of other concept maps that are related to the particular concept under study is displayed. The user can now select one of these maps and be conveyed to that location in the domain model. For example, in FIG. 6, if a user selects the "concept map" icon associated with the concept "Ejection Fraction" in the top level concept map shown in window 40, a popup menu 69 is produced showing other concept maps which are related to the concept Ejection Fraction. The user can select one of those other concept maps to navigate to that concept map.

Concept maps are typically created by a knowledge engineer interviewing an expert on a topic, forming the concepts expressed by the expert into a hierarchical framework of nodes, and using links to connect the concepts according to the expert's view of the topic. Alternatively, the expert may construct the map by him or herself.

Finally, the icon 70 is a backtrack. By selecting this icon, users can return to their previous location in the domain model. The icon 70 is not a mediating representation, but functions as a supporting device which can be used in exploring the domain model.

As can be seen by reference to FIGS. 5–14, a node in a given concept map may have none or several mediating representations associated with that node. Further, it should be noted that a window associated with a given mediating representation may have several supporting devices, including icons indicating the availability of other mediating representations associated with that particular concept under study. For example, in the "Example Images" window 57 illustrated in FIG. 11, the window includes icons indicating the availability of text, concept map, and video mediating representations. These icons and their associated mediating representations provide tools for enabling a user to acquire additional knowledge about the images in the window, or to move from that window to another place in the domain model to continue the user's understanding and exploration of the domain model.

Still further, a concept map hierarchy 72 (FIGS. 5–14) is provided which, in the preferred embodiment, is always available for viewing by a user. The concept map hierarchy 72 identifies the concept map in which the user is currently located within the hierarchy of concept maps in the domain model.

The user interface displays the domain model, or portions thereof, and enables the user to enter the domain model and use the mediating representations to understand and explore different aspects of the domain model. For example, a display monitor associated with the Macintosh™ computer would display the different parts of the domain model (e.g., those parts of the domain model illustrated in FIGS. 5–14). The user interface enables the user to select a particular supporting device, e.g., one of the icons associated with a mediating representation, to utilize that mediating representation to understand or explore the domain model. Moreover, the user interface provides a tool which conveys the user into the domain model to begin the user's interaction with the domain model. For example, during a consultation with the expert system (as shown in window 87 in FIG. 3) the user is offered an opportunity to request an explanation by selecting the "explain" button 93. At this point, based on the context of the user's interaction with the expert system, the user would be conveyed to a relevant location within the domain model to begin interaction with and exploration of the knowledge represented therein. Furthermore, domain models of the sort made possible by the present invention can be used as a reference or teaching tool independent of their use with expert systems.

The system includes an input device including a pointer device (e.g., a mouse, trackball, light pen, keypad, keyboard, etc.) offering the user a tool to move a cursor about the domain model, and to select lines, words, or icons to cause the system to display the mediating representations symbolized by the icon, or to convey the user to another part of the domain model, etc. The Macintosh™ environment, including its graphic user interface, provides convenient tools for producing and displaying the domain model and for enabling a user to enter and interact with the domain model, in order to understand and explore the domain model. The types of input devices described above are well known in the art, and should require no further explanation.

FIGS. 5–14 illustrate part of an exploration of a domain model, to demonstrate the capabilities of the present invention. As shown in FIG. 5, the user has been conveyed into the domain model at the broadest concept in the top level concept map illustrated in the window 40. As illustrated, that broadest or most general concept is described by the expert as "first pass radionuclide ventriculogram". Referring to the concept map hierarchy window 72, the user can see that he is located in the top level concept map. By viewing the top level concept map, the user can see the hierarchical framework used by the expert to describe broad concepts related to nuclear cardiology. The user also gets a view of the icon symbolizing the mediating representations associated with selected concepts forming nodes in the top level concept map. As illustrated in FIG. 5, certain nodes (e.g., "general abnormalities") have a large number of mediating representations associated with them. Other nodes (e.g., Ejection Fraction) may have fewer mediating representations associated with them.

As illustrated in FIG. 6, a user has selected the "concept map" icon associated with the "Ejection Fraction" node in the top level concept map. The popup menu 69 identifies to the user the names of the other concept maps which are related to the "Ejection Fraction" concept. As further illustrated, the user has selected the "Ischemia" concept map in the popup menu 69. The system then conveys the user to the Ischemia concept map illustrated in window 42 in FIG. 7.

While in the Ischemia concept map, the user can view the expert's hierarchical framework of concepts related to Ischemia. Further, as illustrated in FIG. 7, the concept map hierarchy 72 gives the user a visual image of the fact that he is now in the "Ischemia concept map", and locates the "Ischemia concept map" within the concept map hierarchy of the domain model.

Figure 8:
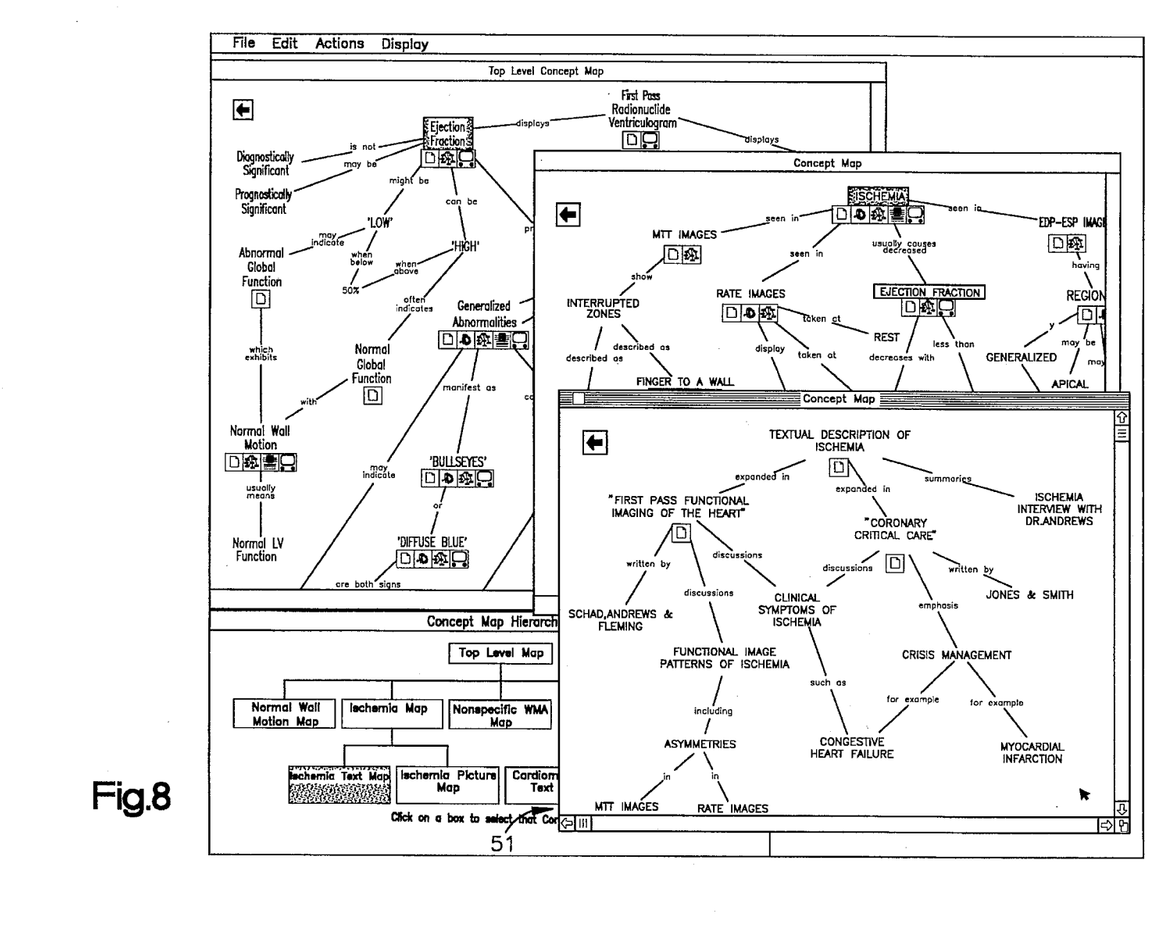
Figure 9:
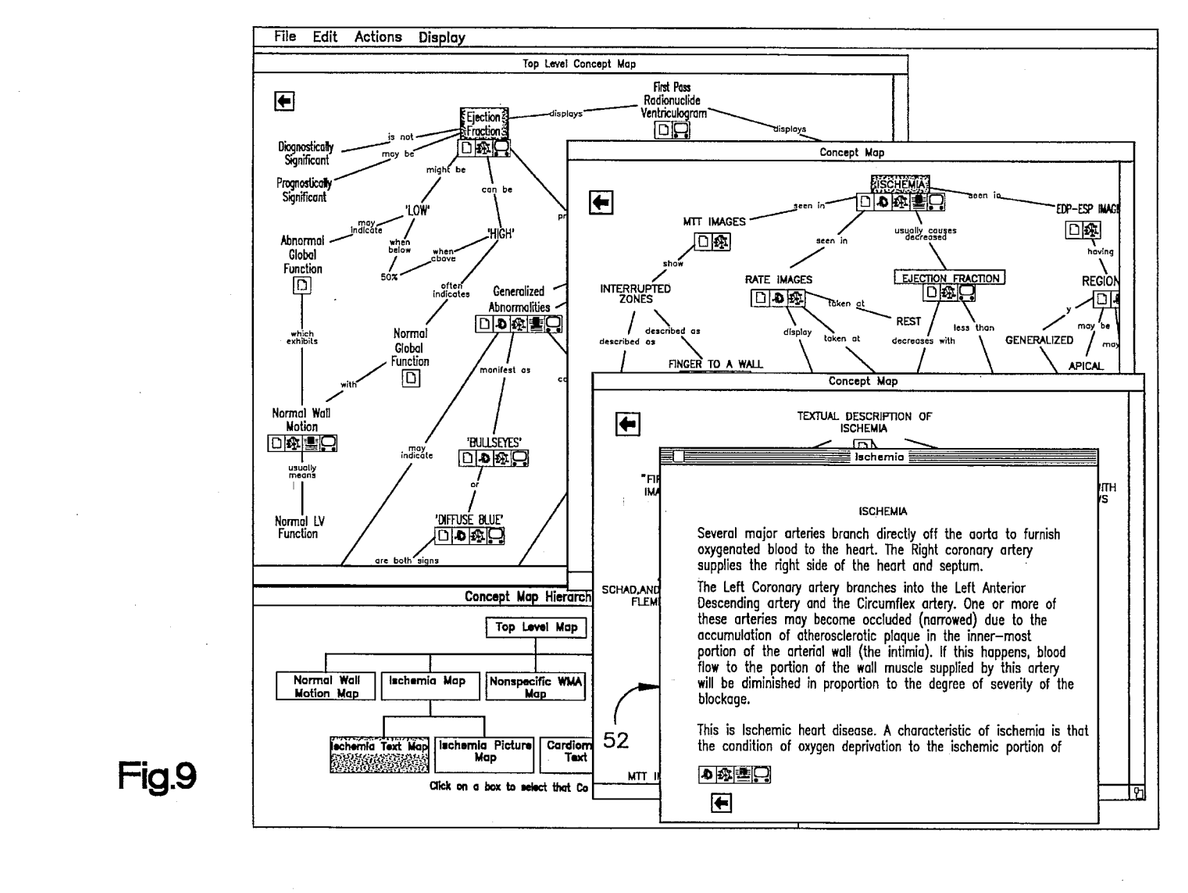

As illustrated in FIG. 8, the user has selected the "text" icon under the broad concept, "Ischemia", in the Ischemia concept map. As illustrated, rather than moving specifically to a body of textual material, the text icon first conveys the user to the Ischemia Text map illustrated in window 51. The Ischemia Text map shows (i) a hierarchical framework of textual concepts related to Ischemia, and (ii) textual mediating representations (e.g., text-based documents) associated with certain of those concepts. By selecting the mediating representation associated with the textual concept labeled "Textual Description of Ischemia" in the textual concept map of FIG. 8, the system produces the window 52 with a body of text describing Ischemia (see FIG. 9). Further, as indicated by the available icons, the window 52 in FIG. 9 offers the user several other mediating representations which would enable the user to further explore the domain model.

FIGS. 10A and 10B illustrates what happens if the user selects the "images" icon at the "Ischemia" node of the Ischemia concept map shown at window 42 in FIGS. 7, 10A and 10B. The window 56 is produced (FIGS. 10A and 10B) showing a concept map identified as "Ischemia Images", with mediating representations available at certain nodes in that concept map. When the user selects the node associated with the concept "Limited Hilat and/or Inferior", the window 57 is opened (FIG. 11) and Example Images related to the concept of limited high lateral or inferior blue fingers are shown, In that window, the user is offered several additional mediating representations to enable the user to further understand and explore the domain model, For example, if the user selects the "concept map" icon in the Example Images window 57 of FIG. 11, the user is conveyed to yet an additional window 68 (FIG. 12) showing a concept map entitled "Nonspecific WMA". That concept map provides a hierarchical framework of additional concepts related to the images shown in the images window 57 (FIG. 11) which the user was exploring. Thus, the user, after navigating through several concept maps, and through several mediating representations, and by using the mediating representations associated with that window, is conveyed to yet another concept map in the domain model, so that the user can continue his exploration of additional aspects of the expert's domain of knowledge underlying the domain model.

Turning to FIGS. 7 and 13, the user has selected the repertory grid icon associated with the Ischemia node shown in window 42 in the Ischemia map. The window 66 is opened providing the user with a repertory grid associated with the Ischemia node. Also, as seen by the icons displayed in that window, additional mediating representations are offered, as well as an opportunity to select an element or construct in the repertory grid to show the information choices for that item.

Finally, FIGS. 7, 14 illustrate the mediating representation presented to the user when the user selects the video icon associated with the Ischemia node shown in window 42 in the Ischemia concept map. The window 60 is opened with a video segment in which the expert offers an explanation of the Ischemia concept. Moreover, although not illustrated in FIG. 14, the window 60 with the video segment could also include appropriate icons to allow further navigation of the domain model from that window.

Thus, from the foregoing discussion, it should be clear how a user can interact with the domain model, using the mediating representations to amplify concepts found in the domain model and/or to navigate to other related concepts. These tools allow the user to browse the domain model as a reference or teaching tool. Moreover, they provide a picture of the knowledge underlying the domain model in such a way that the user can use the domain model to construct his/her own explanations.

Figure 3:
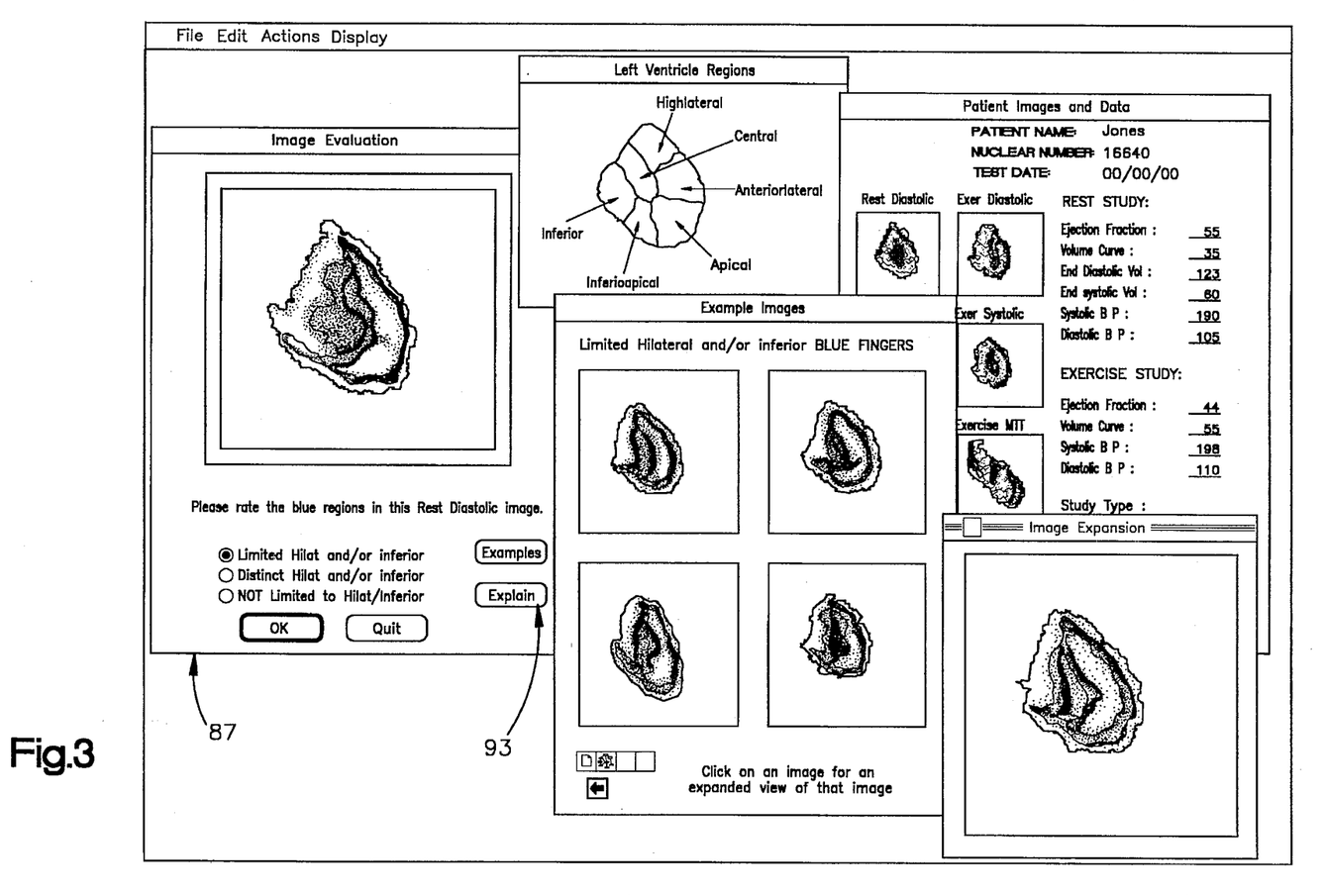
FIGS. 3 and 4 are schematic illustrations of sample display screens created during a consultation with a nuclear cardiology expert system and illustrating the manner in which a user can enter an explanation facility constructed according to the present invention.
Figure 4:
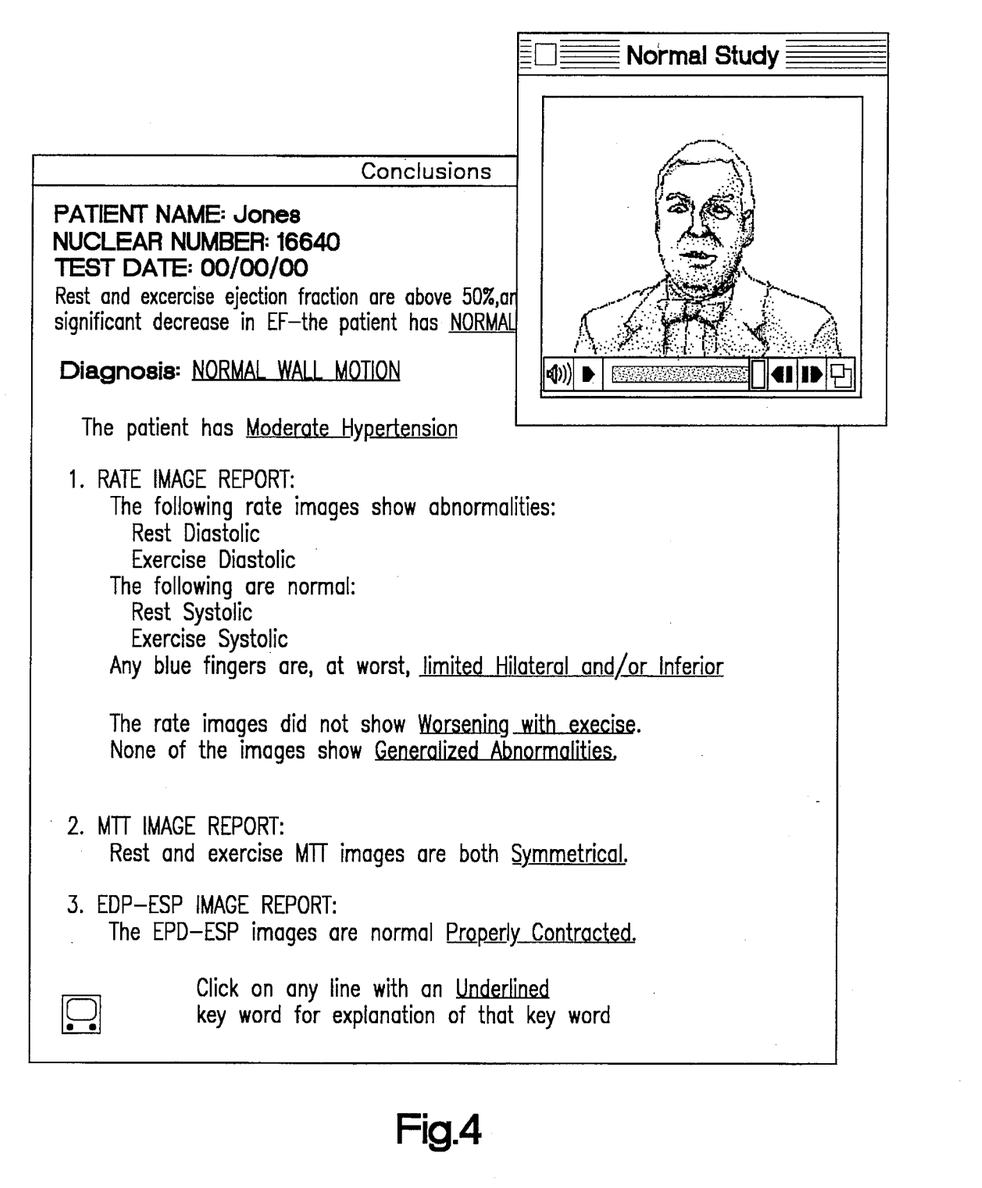

As explained above, when the present invention is associated with an expert system, the user interface can convey the user to an appropriate point in the domain model to enable the user to begin his/her interaction with the domain model. For example, at any time during a consultation with the expert system (e.g., as shown in FIG. 3), or once the expert system has reached a diagnostic conclusion (e.g., as shown in FIG. 4), the user is offered an opportunity to get an explanation of a particular term or concept. When an explanation is requested, the user is conveyed to a location in the domain modelmost apropos to the user's need for an explanation. For example, as illustrated in FIG. 4, if the diagnosis includes the term "Ischemia", by selecting the word "Ischemia", the user would be conveyed directly to the Ischemia concept map. The user would then have available all of the mediating representations and other supporting devices to enable the user to interact with the domain model, to explore the domain model, to further develop an understanding of the basis for the expert system's diagnosis, and/or to further understand the expert's knowledge related to the domain of Ischemia.

Thus, as seen from the foregoing description, the present invention provides a system designed to facilitate a user's understanding of a domain of knowledge. From the foregoing description, it will also be clear that the principles of the present invention can be used to construct explanation tools for various types of expert systems. Further, it will be apparent to those in the art that the principles of the invention can also be used to form teaching and reference tools about a topic, apart from an expert system. With the foregoing disclosure in mind, it is believed that yet additional uses for the present invention will become apparent to those of ordinary skill in the art.

We claim:

1. A system for enabling an end-user to understand and explore knowledge about a particular topic, comprising a computer having:

a. an output means for presenting information to the end-user;
   b. a memory means for storing and retrieving information;
   c. a means for interfacing the end-user to said system, said means for interfacing comprising an input device, and said computer further comprising means for generating icons on said output means, said icons having pictures, each picture representing a mode of output of information from said computer; and d. a means for presenting information to the end-user pertaining to at least one of a plurality of selected concepts underlying a particular domain of knowledge, in communication with said output means, memory means, and means for interfacing the end-user, said means for presenting information to the end-user including said icons and a concept map-based representation of said particular domain of knowledge;
   said concept map-based representation comprising:
   i. at least one concept map having:
      (1) a plurality of concept nodes, wherein each of said concept nodes represents a concept in said particular domain of knowledge; and
      (2) at least one link for linking a discrete pair of concept nodes thereby forming a semantic unit, said semantic unit forming a proposition; and
   said concept map further comprising a plurality of said icons, said icons being arranged in groups of one or more icons, each of said groups being associated on said concept map with one of said concept nodes;
   ii. information associated with said concept nodes accessible through end-user selection of an icon in said groups of one or more icons associated with said concept nodes;

said system including means for generating said concept map with said icons on said output means;

said system further including means for generating an output responsive to end-user selection of an icon associated with a concept node, the substance of said output corresponding to information associated with said concept node, and the mode of said output corresponding to the picture in said icon, to thereby form an interface from each concept node and said icons associated therewith to said information in said concept map based representation of said particular domain of knowledge.

2. The system of claim 1 wherein said output means comprises a means for displaying information.

3. The system of claim 2 wherein said output means further comprises a means for producing audio signals.

4. The system of claim 1 wherein said output is selected from a group consisting of video, audio, text, repertory grids, concept maps, and combinations of the foregoing.

5. The system of claim 1 wherein said output comprises video.

6. The system of claim 5 wherein said output further comprises audio.

7. The system of claim 1 wherein said output comprises audio.

8. The system of claim 1 wherein said concept map based representation further comprises a concept map hierarchy having an overview of concepts in said domain of knowledge; and said system including means for generating said concept map hierarchy on said output means.

9. The system of claim 8 wherein said concept map hierarchy is configured responsive to said means for interfacing an end-user to convey said end-user to said at least one concept map in said domain of knowledge.

* * * * *